(12) United States Patent
Griffith (10) Patent No.: US 7,013,427 B2
(45) Date of Patent: Mar. 14, 2006

(54) COMMUNICATION ANALYZING SYSTEM (75) Inventor: Steven B. Griffith, Los Angeles, CA (US) 90067

(73) Assignee: Steven Griffith, Los Angeles, CA (US)

( * ) Notice: Subject to any disclaimer, the term of this patent is extended or adjusted under 35 U.S.C. 154(b) by 466 days.

(21) Appl. No.: 10/127,069

(22) Filed: Apr. 19, 2002

(65) Prior Publication Data

US 2002/0163500 A1 Nov. 7, 2002

Related U.S. Application Data (60) Provisional application No. 60/286,167, filed on Apr. 23, 2001.

(51) Int. Cl.
*G06F 17/00* (2006.01)

(52) U.S. Cl. ...................... 715/530; 709/206

(58) Field of Classification Search ............... 715/530, 715/501.1; 704/275; 705/37; 709/223, 709/206; 707/100, 102, 5; 717/174
See application file for complete search history.

(56) References Cited

U.S. PATENT DOCUMENTS

| | | | | |
|---|---|---|---|---|
| 5,768,580 | A * | 6/1998 | Wical | 707/102 |
| 5,859,636 | A * | 1/1999 | Pandit | 715/501.1 |
| 5,885,083 | A * | 3/1999 | Ferrell | 434/156 |
| 6,035,288 | A * | 3/2000 | Solomon | 705/37 |
| 6,285,993 | B1 * | 9/2001 | Ferrell | 706/45 |
| 6,332,143 | B1 * | 12/2001 | Chase | 707/100 |
| 6,401,094 | B1 * | 6/2002 | Stemp et al. | 707/10 |
| 6,418,435 | B1 * | 7/2002 | Chase | 707/5 |
| 6,513,011 | B1 * | 1/2003 | Uwakubo | 704/275 |
| 6,622,140 | B1 * | 9/2003 | Kantrowitz | 707/5 |
| 6,632,251 | B1 * | 10/2003 | Rutten et al. | 715/530 |
| 6,658,388 | B1 * | 12/2003 | Kleindienst et al. | 704/275 |
| 6,668,281 | B1 * | 12/2003 | Ayyadurai | 709/223 |
| 6,718,367 | B1 * | 4/2004 | Ayyadurai | 709/206 |
| 6,718,368 | B1 * | 4/2004 | Ayyadurai | 709/206 |
| 6,779,178 | B1 * | 8/2004 | Lloyd et al. | 717/174 |
| 6,826,540 | B1 * | 11/2004 | Plantec et al. | 705/10 |
| 6,957,384 | B1 * | 10/2005 | Jeffery et al. | 715/501.1 |
| 2004/0205643 | A1 * | 10/2004 | Harrington | 715/530 |

OTHER PUBLICATIONS

Picard et al., "Computers that recognise and Respond to User Emotion: Theoretical and Practical Implications", MIT Media Lab Tech Report 538, Nov. 12, 2001.*
Klein et al., "This Computer responds to User Frustration", ACM CHI 1999, May 15-20, 1999.*
author unknown, A Pervasive Personality Type Determination System, Apr. 2001, IBM Technical Disclosure NNRD444151, 2 pages.*

* cited by examiner

*Primary Examiner*—William Bashore
*Assistant Examiner*—James H Blackwell
(74) *Attorney, Agent, or Firm*—Steven Griffith (57) ABSTRACT

A communication analyzing system for effectively determining a first communication style, emotion and personality of a first communication and an appropriate reply communication style for a reply communication. The communication analyzing system includes entering a communication into an input section, analyzing the text within the communication, determining a communication style of the communication, and displaying the communication style of the communication. The communication style is determined by comparing the words and phrases contained within the communication with conventional neuro-linguistic and brain dominance models and theories. The user may utilize the interface to enter various proposed communications until a desired communication style is achieved that will appeal to the audience.

15 Claims, 6 Drawing Sheets

COMMUNICATION ANALYZING SYSTEM

CROSS REFERENCE TO RELATED APPLICATIONS

I hereby claim benefit under Title 35, United States Code, Section 119(e) of U.S. provisional patent application Ser. No. 60/286,167 filed Apr. 23, 2001. The Ser. No. 60/286,167 application is currently pending. The Ser. No. 60/286,167 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to communication analyzers and more specifically it relates to a communication analyzing system for effectively determining a first communication style, emotion and personality type of a first communication and an appropriate reply communication style for a reply communication.

With the proliferation of connections to the Internet by a rapidly growing number of individuals, the viability of the Internet as a widely accepted medium of communication and business activity has increased correspondingly. The Internet is comprised of a global computer network allowing various types of data to be transmitted including but not limited to video, audio and graphical images. The type of connection the individual has to the Internet determines the overall quality and speed of their Internet experience. With increasing bandwidth and decreasing prices of Internet connections available to consumers such as DSL, ISDN, T1, T3 and cable modems, increased usage and quality of Internet related activities will inevitably occur.

With the dramatic increase of individuals utilizing the Internet in recent years, there has been a significant increase in electronic communications whether between individuals or from a potential customer to a business. It is important for an individual replying to another person's communication to have a similar reply communication style to effectively communicate. Hence, there is a need for a communication analyzing system that effectively determines the communication style,emotion and personality of the sender of a communication so that a desired reply communication may be effectively utilized.

2. Description of the Related Art

Communication analyzers have been in use for years in various forms. Companies such as INSIGHT, THOUGHTSCAN and ECHOMAIL have been creating communication analyzers that respectively analyze consumer information in real-time to generate buying preference data, utilize psychological profiling for hiring purposes, and processing/categorizing high volume electronic mail (e-mail) for automated response systems. Grammar checking programs such as the grammar checking feature of MICROSOFT WORD analyze a document to determine whether proper grammar has been utilized by the writer.

Conventional communication analyzers do not determine an appropriate reply communication style, emotion and personality type in response to a first communication style by another individual. Another problem with conventional communication analyzers is that they do not evaluate the content or meaning of an individual's mode of communication. A further problem with conventional communication analyzers is that they do not provide the user with different models of communication to select from to improve the effectiveness of their own communications based upon their audience.

While conventional communication analyzers may be suitable for the particular purpose to which they address, they are not as suitable for effectively determining a first communication style, emotion and personality type of a first communication and an appropriate reply communication style for a reply communication. Conventional communication analyzers typically are concerned solely with the grammar and structure of a single communication without considering the communication style of the sender and a desirable reply communication style by a replier.

In these respects, the communication analyzing system according to the present invention substantially departs from the conventional concepts and designs of the prior art, and in so doing provides a system primarily developed for the purpose of effectively determining a first communication style, emotion and personality type of a first communication and an appropriate reply communication style for a reply communication.

BRIEF SUMMARY OF THE INVENTION

In view of the foregoing disadvantages inherent in the known types of communication analyzers now present in the prior art, the present invention provides a new communication analyzing system wherein the same can be utilized for effectively determining a first communication style, emotion and personality type of a first communication and an appropriate reply communication style for a reply communication.

The general purpose of the present invention, which will be described subsequently in greater detail, is to provide a new communication analyzing system that has many of the advantages of the communication analyzers mentioned heretofore and many novel features that result in a new communication analyzing system which is not anticipated, rendered obvious, suggested, or even implied by any of the prior art communication analyzers, either alone or in any combination thereof.

To attain this, the present invention generally comprises entering a communication into an input section, analyzing the text within the communication, determining a communication style of the communication, and displaying the communication style of the communication. The communication style is determined by comparing the words and phrases contained within the communication with conventional neuro-linguistic, learning theory and brain dominance models and theories. The user may utilize the interface to enter various proposed communications until a desired communication style is achieved that will appeal to the audience.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a communication analyzing system that will overcome the shortcomings of the prior art systems.

A second object is to provide a communication analyzing system for effectively determining a first communication style, emotion and personality type of a first communication and an appropriate reply communication style for a reply communication.

Another object is to provide a communication analyzing system that analyzes the use of verbal and written language according to specific communication models utilizing conventional neuro-linguistic programming (NLP) and brain dominance technologies.

An additional object is to provide a communication analyzing system that increases an individual's ability to effectively communicate with others.

A further object is to provide a communication analyzing system that assists an individual with both verbal and written communication skills.

Another object is to provide a communication analyzing system that assists an individual in communicating with all communication models, emotional position and personality type.

A further object is to provide a communication analyzing system that educates an individual regarding the various communication models.

Another object is to provide a communication analyzing system that identifies an individual's communication style thereby allowing them to determine whether their communication style is narrow or broad for the audience they intend to reach.

A further object is to provide a communication analyzing system that provides a visual interpretation of a communication style.

Another object is to provide a communication analyzing system that calculates the word usage and phrase frequency within a communication.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), a ROM, or the like. Computer instruction signals may be embodied in a transmission medium (with or without a carrier wave upon which the signals are modulated). For example, the transmission medium may include a communications network, such as the Internet.

A. Exemplary Computer System

Figure 1:
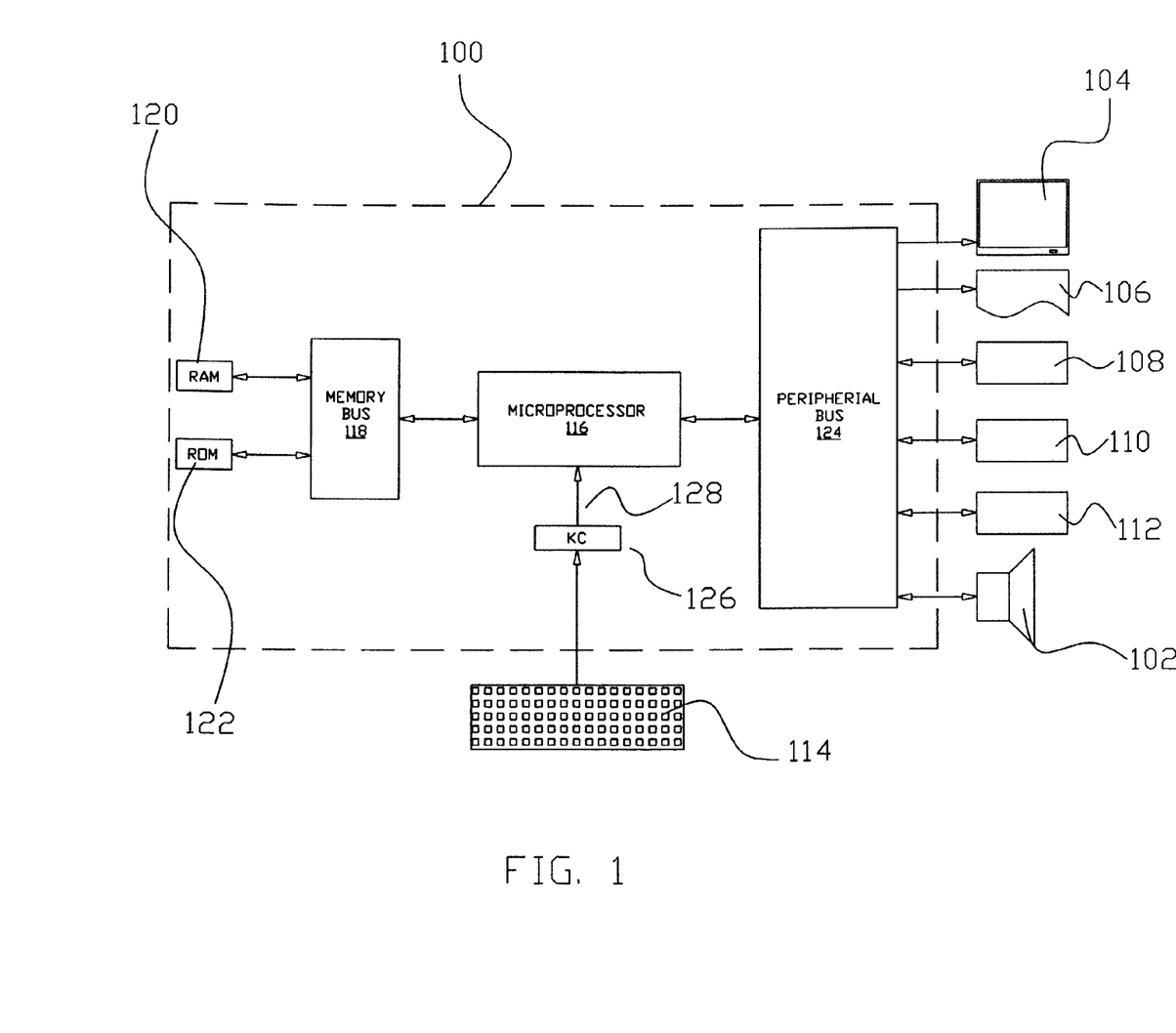
FIG. 1 is a block diagram of an exemplary computer system.

FIG. 1 is a block diagram of an exemplary computer system 100 for practicing the various aspects of the present invention. The computer system 100 includes a display screen (or monitor) 104, a printer 106, a floppy disk drive 108, a hard disk drive 110, a network interface 112, and a keyboard 114. Computer system 100 includes a microprocessor 116, a memory bus 118, random access memory (RAM) 120, read only memory (ROM) 122, a peripheral bus 124, and a keyboard controller 126. Computer system 100 can be a personal computer (such as an APPLE computer, an IBM computer, or one of the compatibles thereof), a workstation computer (such as a SUN MICROSYSTEMS or HEWLETT-PACKARD workstation), or various other types of computers.

The microprocessor 116 is a general-purpose digital processor that controls the operation of the computer system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by the microprocessor 116 to access the RAM 120 and the ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the computer system 100. In the described embodiment(s), these devices include a display screen 104, a printer device 106, a floppy disk drive 108, a hard disk drive 110, and a network interface 112. A keyboard controller 126 is used to receive input from the keyboard 114 and send decoded symbols for each pressed key to microprocessor 116 over bus 128.

The display screen 104 is an output device that displays images of data provided by the microprocessor 116 via the peripheral bus 124 or provided by other components in the computer system 100. The printer device 106 when operating as a printer provides an image on a sheet of paper or a similar surface. Other output devices such as a plotter, typesetter, etc. can be utilized in place of, or in addition to, the printer device 106.

The floppy disk drive 108 and the hard disk drive 110 can be utilized to store various types of data. The floppy disk drive 108 facilitates transporting such data to other computer systems, and the hard disk drive 110 permits fast access to large amounts of stored data.

The microprocessor 116 together with an operating system operate to execute computer code and produce and use data. The computer code and data may reside on RAM 120, ROM 122, or hard disk drive 110. The computer code and data can also reside on a removable program medium and loaded or installed onto computer system 100 when needed. Removable program mediums include, for example, CD-ROM, PC-CARD, floppy disk and magnetic tape.

The network interface circuit 112 is utilized to send and receive data over a network connected to other computer systems. An interface card or similar device and appropriate software implemented by microprocessor 116 can be utilized to connect the computer system 100 to an existing network and transfer data according to standard protocols.

The keyboard 114 is used by a user to input commands and other instructions to the computer system 100. Other types of user input devices can also be used in conjunction with the present invention. For example, pointing devices such as a computer mouse, a track ball, a stylus, or a tablet to manipulate a pointer on a screen of the computer system 100.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

B. Global Communications Network

Figure 2:
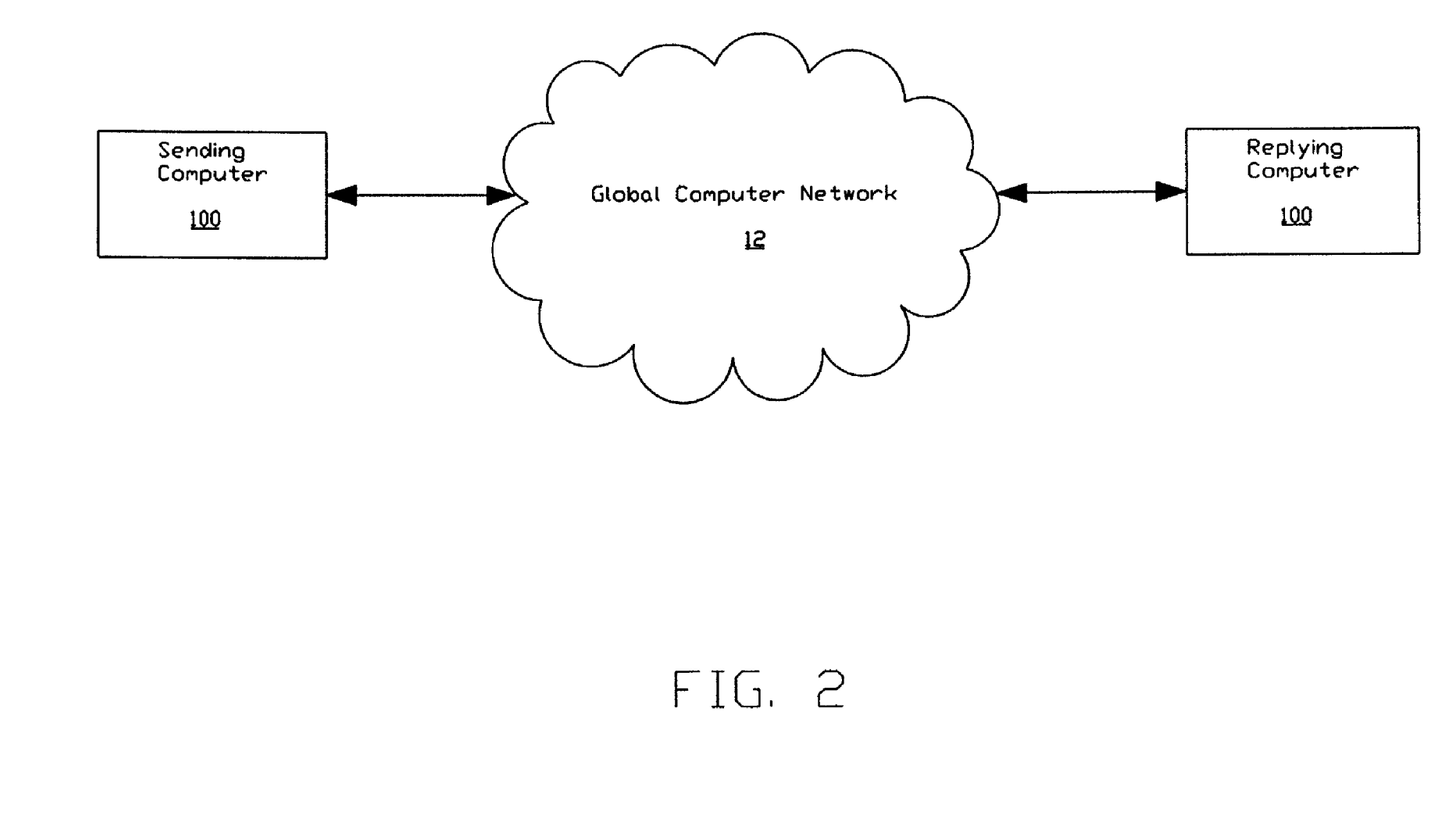
FIG. 2 is a block diagram of a sender computer and a reply computer in communication via a global computer network.
Figure 3:
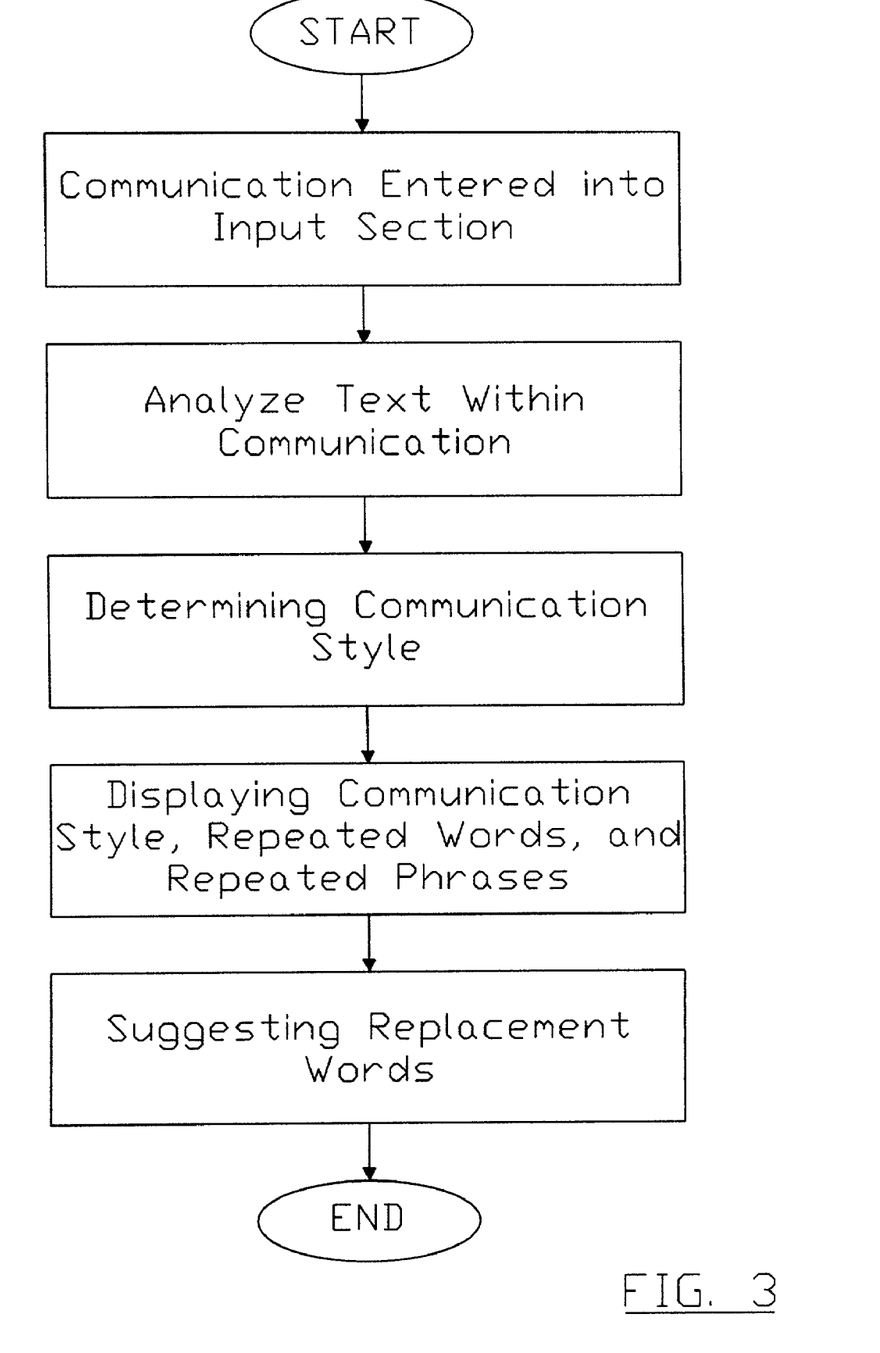
FIG. 3 is a flowchart illustrating the basic functionality of the present invention.

As shown in FIG. 2, the Internet 12 is comprised of a "global computer network". A plurality of computer systems 100 around the world are in communication with one another via this global computer network. The present invention utilizes the Internet 12, however it can be appreciated that as future technologies are created that various aspects of the invention may be practiced with these improved technologies. The present invention may also be utilized upon a single computer for analyzing a communication entered by the user without ever communicating with another computer.

C. Software Embodiment

The present invention is preferably embodied within a software program stored and/or readable upon the computer system 100. The present invention may be programmed utilizing various programming languages such as but not limited to JAVA, C, C++, COBOL, or other programming language. The present invention may be programmed for operation upon personal data assistants (PDAs) or similar devices.

D. Interface

Figure 4:
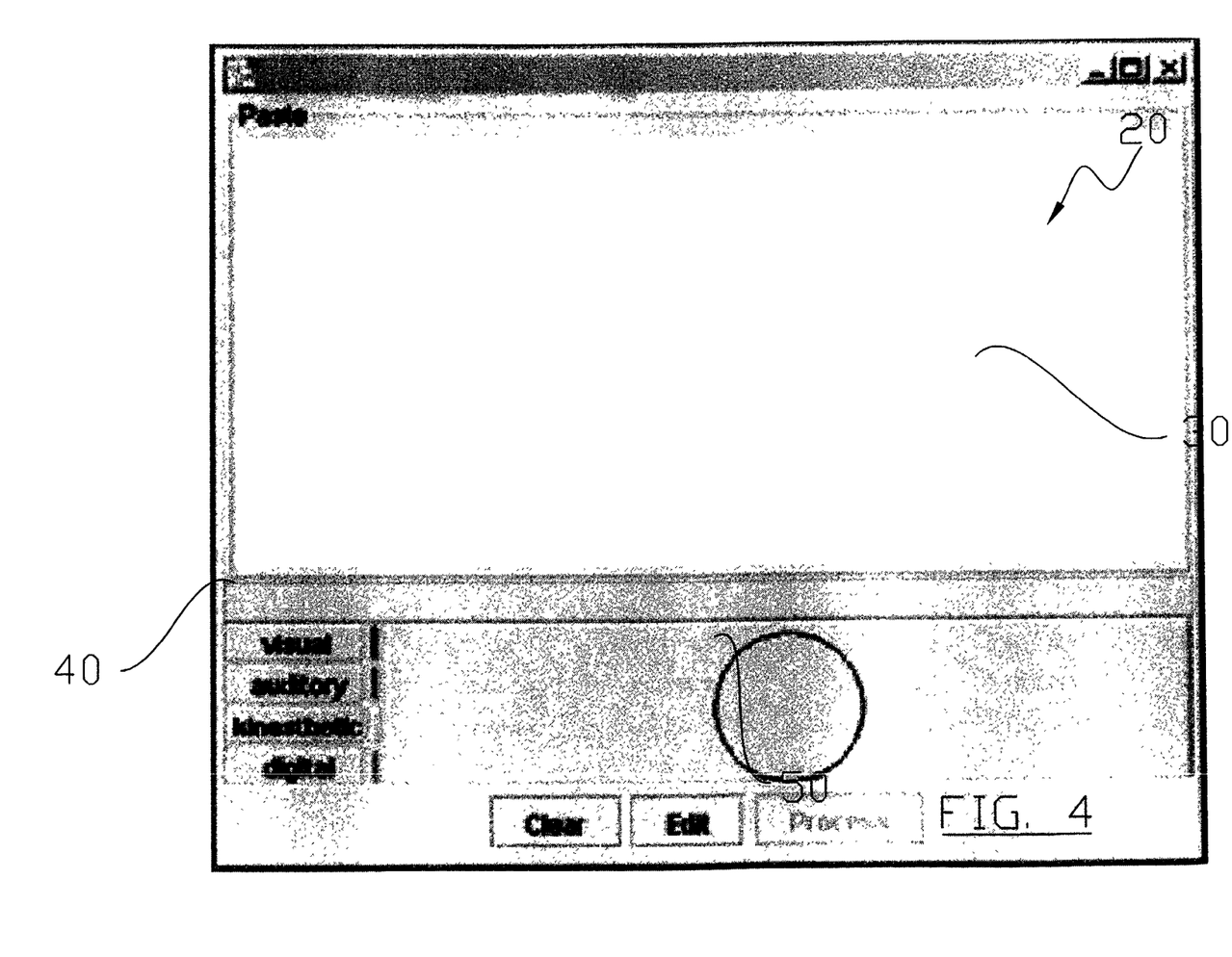
FIG. 4 is an exemplary interface for the present invention.
Figure 5:
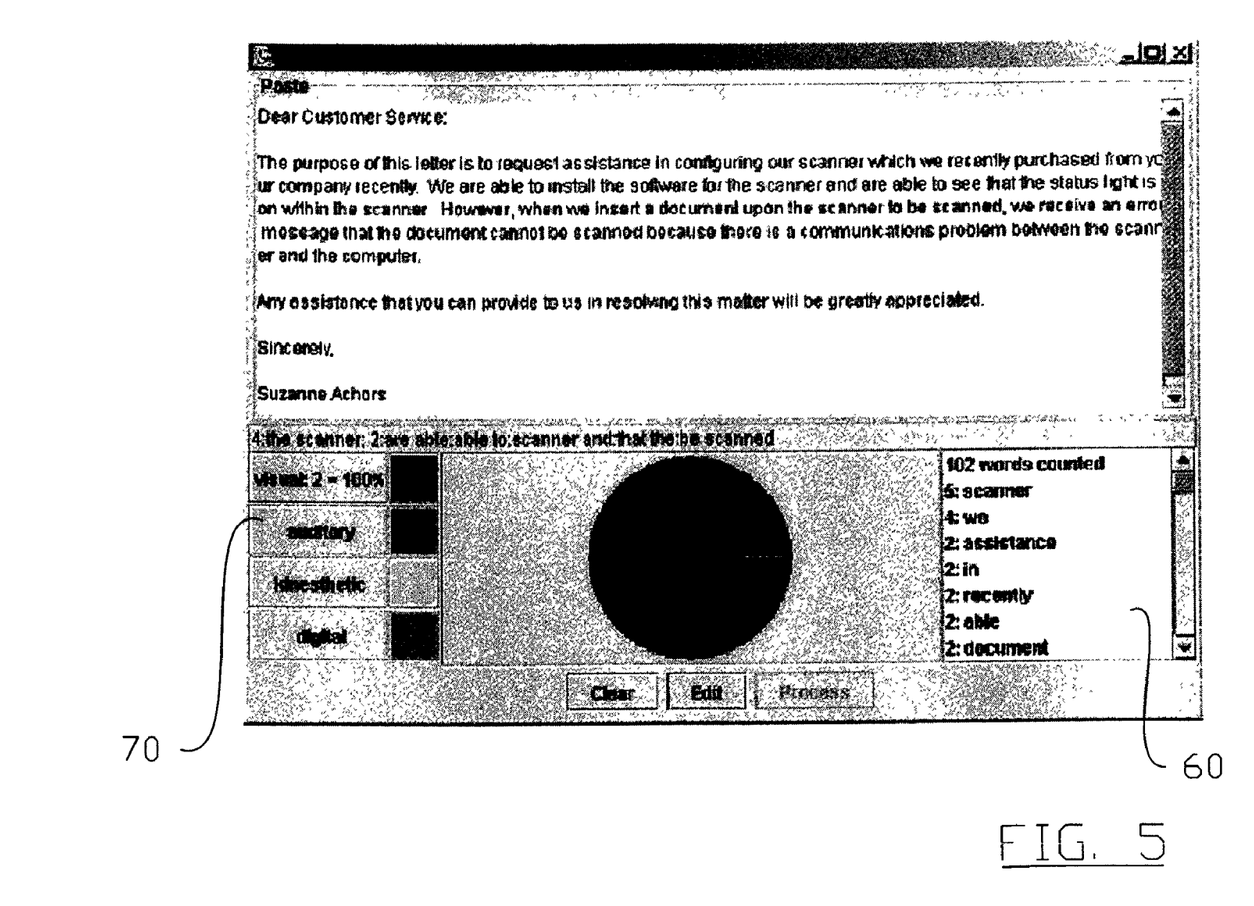
FIG. 5 is the exemplary interface with a communication contained within and analyzed.
Figure 6:
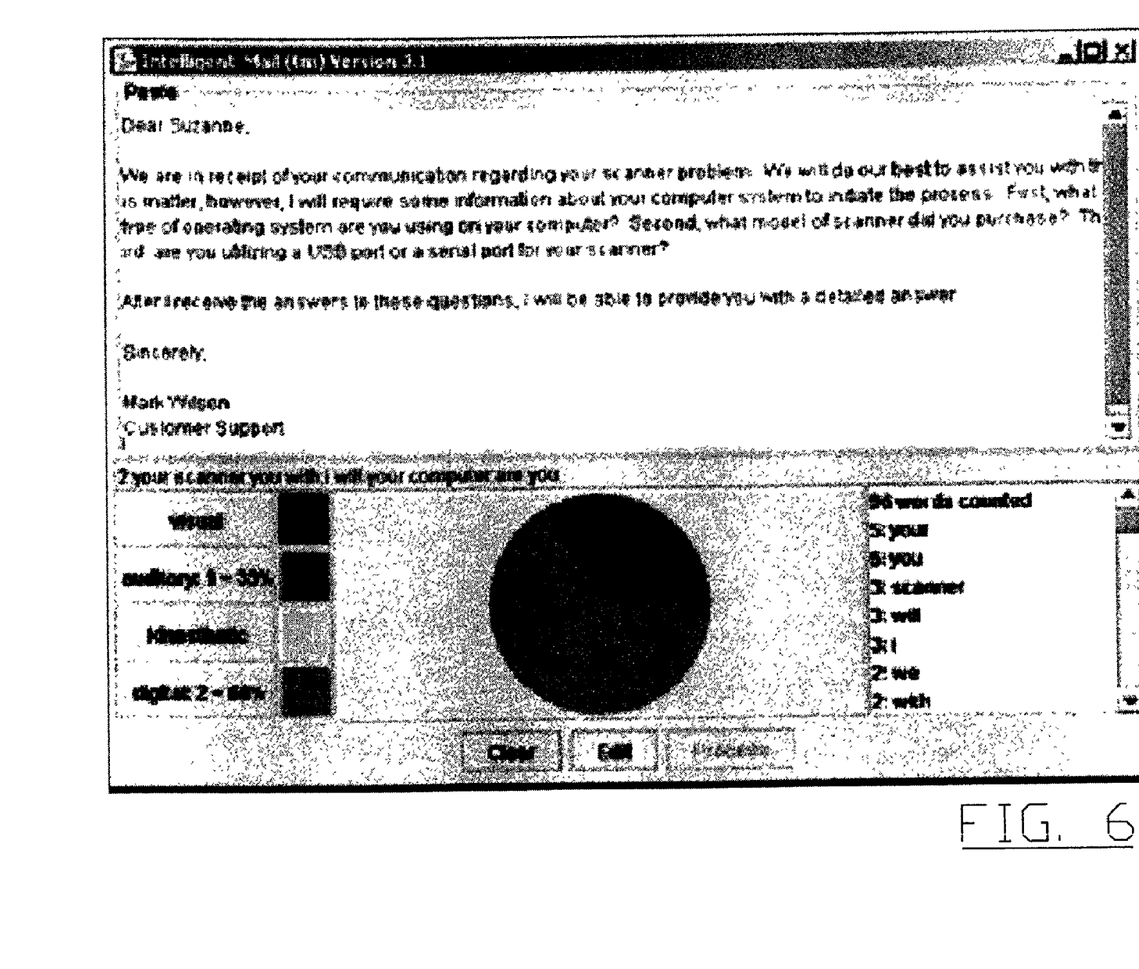
FIG. 6 is the exemplary interface with a proposed reply communication contained within and analyzed.

As shown in FIGS. 4 through 6 of the drawings, the interface 20 preferably has an input section 30 for entering the communication to be analyzed. The communication may be inserted into the interface utilizing a conventional copy-paste routine, a file insert function, voice recognition software, or other commonly utilized technique for entering a textual communication into the interface. The interface may have various features such as allowing for the direct editing of the communication within allowing for the modification of the communication based upon the communication style desired. The textual communication entered into the interface may be originally from an textual document, computer file, voice recording or other original communication.

A further shown in FIGS. 4 through 6 of the drawings, the interface 20 preferably includes a numerical representation 40 and/or graphical representation 50 of the communication style of the textual communication. The numerical representation 40 provides an indication of the types of communication style that the communication contains within such as but not limited to visual, auditory, kinesthetic, digital, left-brain, right-brain, first person, second person and third person. The numerical representation 40 may contain the total number, fraction and/or percentage of words/phrases that fall within a specific communication style as shown in FIGS. 5 and 6 of the drawings. The graphical representation 50 may be comprised of a conventional chart illustration such as but not limited to a pie chart as shown in FIGS. 5 and 6 of the drawings. The various communication categories are preferably color coded to improve the ability of the user to understand the communication style being utilized within the communication.

As further shown in FIGS. 5 and 6 of the drawings, a word count section 60 may also be contained within the interface 20 which provides a total word count along with the total number of times a specific word is stated within the communication thereby providing an indication to the user of excessively repeated words. In addition, a phrase count section 70 may also be contained within the interface 20 which provides a total phrase count along with the total number of times a specific phrase is stated within the communication thereby providing an indication to the user of excessively repeated phrases. Various other measuring tools may be incorporated within the interface for measuring and indicating the communication style of the communication.

Various other interface structures may be utilized within the present invention. For example, a split-screen interface may be utilized for visually comparing a first communication and a second communication to one another.

E. Analyzing the Communication

After a communication has been entered into the input section 30, the text within the communication is sorted based upon their respective communication style. Commonly utilized words (e.g. "a", "an", "the") are screened during the communication analysis thereby removing undesirable words from the word count section 60. For example, if a word or phrase has a visual communication style (e.g. "I see what you are saying."), the word or phrase is placed within the visual category. The present invention continues to analyze every word and phrase including derivatives thereof within the communication until the overall communication style is determined. The text within the input section 30 may be highlighted to indicate repeated words and phrases along with the style of communication being utilized within specific sections.

Utilizing conventional communication model analysis such as but not limited to neuro-linguistic, brain dominance, emotion and personality type models, the overall communication style of the communication is determined. In addition to the communication style of individual words and phrases, the invention further calculates the total number of words along with the number of times a word or phrase is repeated throughout the communication. In addition, the emotional position and personality type of the author of the communication may be determined based upon frequently utilized words and phrases.

F. Displaying Results

Once the communication has been analyzed and determined, the present invention then displays the results of the analysis upon the interface 20 as shown in FIGS. 5 and 6 of the drawings. FIG. 5 illustrates a first communication that has two words which are in the visual category with various repeated words and phrases. Though not conclusive, the sender of the first communication in FIG. 5 appears to be a visual communicator which indicates they will be more receptive to a reply communication style that is also visual.

FIG. 6 illustrates a proposed reply communication that has 1 word within the auditory category and 2 words in the digital category with none in the visual category. If the user were preparing the reply communication, they would attempt to modify words within the reply communication until a communication style is represented that is similar to the communication style of the original sender to enhance communication between the parties. This can be done by using the edit feature, where the reply text is typed into the input section and by selecting process the software then calculates the mode percentage of each category. This can be repeated until the author is comfortable with the mode percentage.

G. Modification of Communication

The present invention has a dictionary of words and phrases having various communication styles cross-referenced to one another to provide suggestions to the user on replacement words that are within the desired category. An auto correction functionality may be incorporated within the present invention that allows the individual to direct the program to automatically change the communication style of the communication utilizing conventional or customized cross-referencing dictionaries. A grammar-checking feature along with proof reading of the communication ensures that the communication has been appropriately changed.

H. Operation

The present invention may be utilized for various purposes such as but not limited to (i) determining an appropriate reply communication style to a first communication, (ii) determining a user's personal communication style, emotion and personality type (iii) assisting in modifying a communication to a specific communication style, (iv) assisting in preparing a communication to an audience having a known communication style predisposition, and (v) other communication purposes. In use, the user first inputs the textual embodiment of the communication to be analyzed within the input section 30 of the interface 20. The user then selects a button upon the interface 20 that initiates the communication style analysis of the communication based upon conventional communication models. After the communication has been analyzed, the interface displays a numerical representation of the communication style within the numerical representation section 40 and a graphical representation within the graphical representation section 50 as shown in FIG. 5 of the drawings. In addition, repeated words and phrases are displayed within the interface 20 within the word count section 60 and the phrase count section 70 respectively as further shown in FIG. 5 of the drawings. Based upon the information shown within the interface 20 after the analysis, the user can determine the communication style of the author of the communication. The user then may formulate a response communication that is similar in communication style to the first communication as shown in FIG. 6. For example, if the first communication were mainly visual based, the user would want to reply with a visual based reply communication. FIG. 6 illustrates a proposed reply communication that has an auditory and a digital communication style with little or no visual communication style contained within. The author of the proposed reply communication may (1) have the program automatically make proposed changes to modify the reply communication to a visual based reply communication, (2) use the available dictionaries within the program to find substitute visual-based words, or (3) make changes to the reply communication until the desired communication style is achieved.

As to a further discussion of the manner of usage and operation of the present invention, the same should be apparent from the above description. Accordingly, no further discussion relating to the manner of usage and operation will be provided.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of utilizing a communication analyzing system, said method comprising the steps of:
   a) entering a first communication into an input section of a computer interface by a receiving party;
   (b) analyzing text within said first communication;
   (c) determining a first communication style of said first communication, wherein the first communication style is selected from at least four styles and the at least four styles include a visual style, an auditory style, a kinesthetic style, and a digital style;
   (d) for at least one of the at least four styles, determining a percentage of the first communication that falls within that style;
   (f) displaying said first communication style; and
   (g) displaying the percentages of the first communication that fall within each of the at least four styles.

2. The method of claim 1, further comprising the steps of:
   (h) after displaying said first communication style, preparing a reply communication;
   (i) entering said reply communication into said input section of said computer interface by said receiving party;

(j) analyzing text within said reply communication;
(k) determining a reply communication style of said reply communication, wherein the reply communication style is selected from the at least four styles; and
(l) displaying said reply communication style of said reply communication.

3. The method of claim 2, further comprising the steps of:
(m) for at least one of the at least four styles, determining a percentage of the reply communication that falls within that style; and
(n) displaying the percentages of the reply communication that fall within each of the at least four styles.

4. The method of claim 1, wherein said step of displaying said first communication style includes a graphical representation of the said first communication style.

5. The method of claim 1, further comprising displaying a word count section.

6. The method of claim 1, further comprising displaying a phrase count section.

7. The method of claim 2, further comprising the step of comparing said reply communication style with said first communication style.

8. The method of claim 7, further comprising the step of modifying said reply communication style if said first communication style is different from said reply communication style.

9. The method of claim 8, wherein the step of modifying said reply communication includes automatically modifying said reply communication to a communication style set by the user.

10. An article of manufacture comprising a computer usable medium having a computer readable program code embodied therein for analyzing a first communication and a reply communication, said computer readable program code in the article of manufacture comprising:
computer readable program code for causing a computer to receive a first communication;
computer readable program code for causing a computer to determine a first communication style of a first communication, wherein the first communication style is selected from at least four styles and the at least four styles include a visual style, an auditory style, a kinesthetic style, and a digital style;
computer readable program code for determining, for each of the at least four styles, a percentage of the first communication that falls within that style; and
computer readable program code for causing a computer to display said first communication style within an interface and for causing the computer to display the percentages of the first communication that fall within each of the at least four styles.

11. The article of manufacture of claim 10, the computer readable program code further comprising:
computer readable program code for causing a computer to receive a reply communication in response to said first communication, analyze said reply communication and automatically propose changes to said reply communication based upon a communication style similar to the communication style of said first communication.

12. The article of manufacture of claim 10, wherein said interface includes a graphical representation of said first communication style.

13. A process for analyzing and assisting in responding to electronic text messages of a synchronous communications systems comprising the steps of:
(a) receiving a first communication;
(b) analyzing text within said first communication;
(c) determining a first communication style of said first communication, wherein the first communication style is selected from at least four styles and the at least four styles include a visual style, an auditory style, a kinesthetic style, and a digital style;
(d) for at least one of the at least four styles, determining a percentage of the first communication that falls within that style;
(f) displaying said first communication style; and
(g) displaying the percentages of the first communication that fall within each of the at least four styles.

14. The process of claim 13, further comprising the steps of:
(h) receiving a reply communication;
(i) analyzing text within said reply communication;
(j) determining a reply communication style of said reply communication, wherein the reply communication style is selected from the at least four styles; and
(k) displaying said reply communication style of said reply communication.

15. The method of claim 14, further comprising the steps of:
(l) for at least one of the at least four styles, determining a percentage of the reply communication that falls within that style;
(m) displaying the percentages of the reply communication that fall within each of the at least four styles.

* * * * *